July 3, 1934.   P. G. DARLING   1,965,307
POWER CONTROL VALVE
Filed Jan. 7, 1931   4 Sheets-Sheet 1
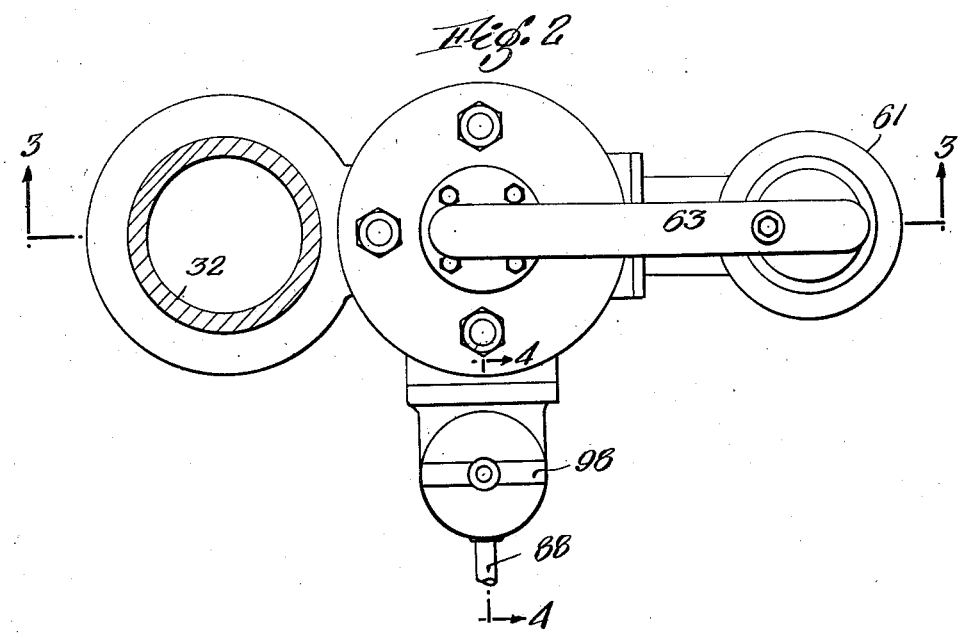
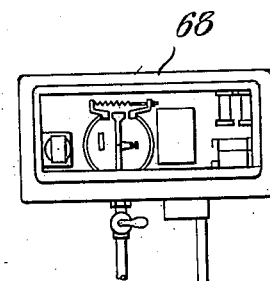
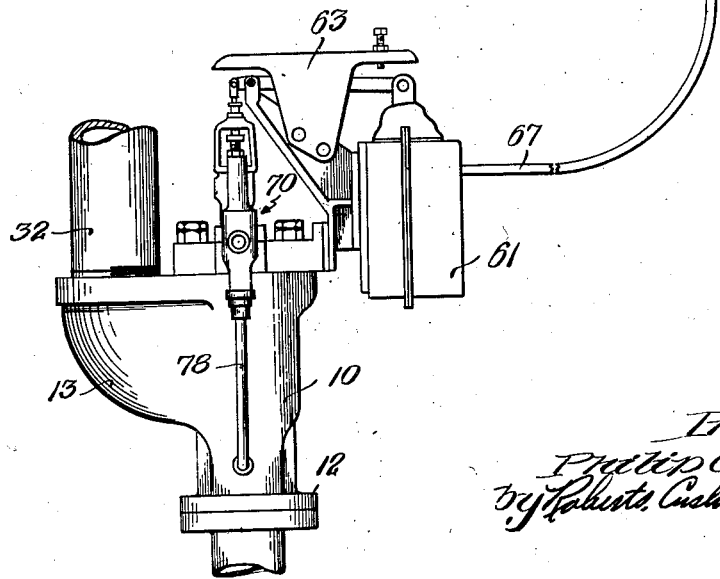
Inventor
Philip G. Darling
by Roberts, Cushman & Woodberry
Attys.

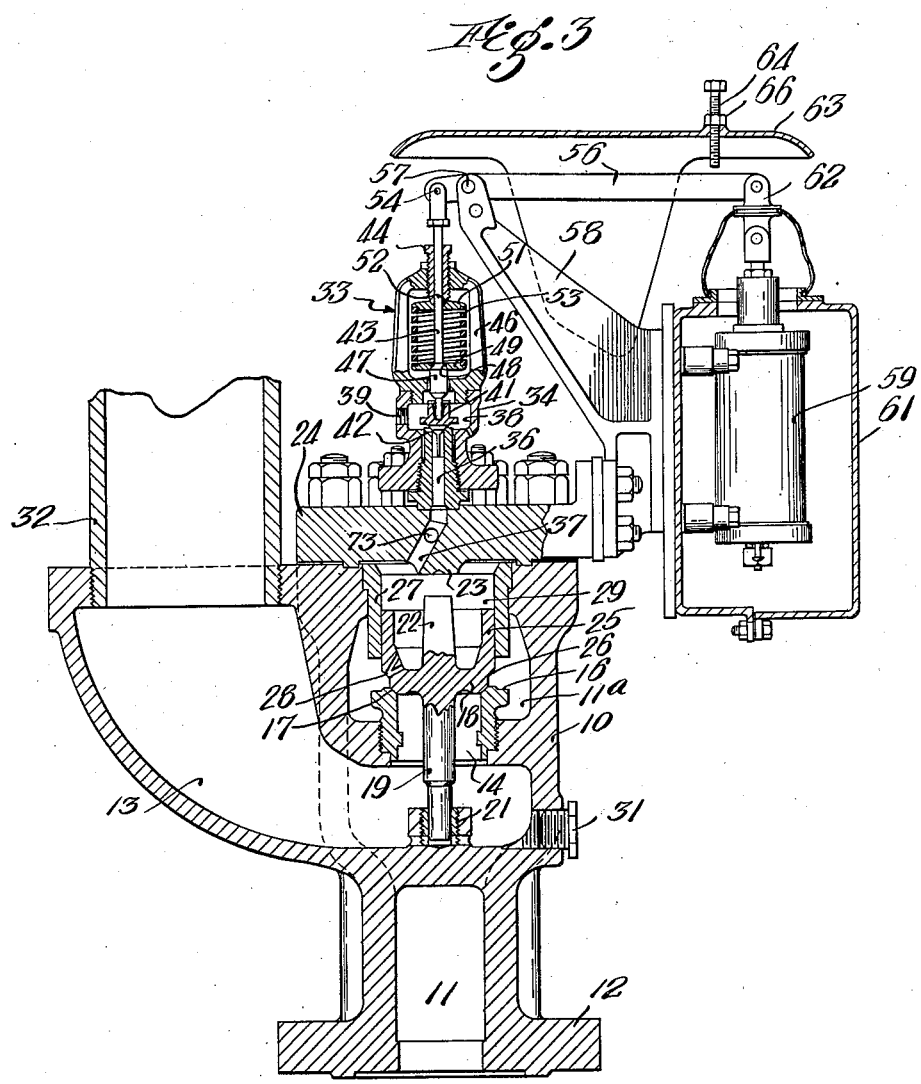

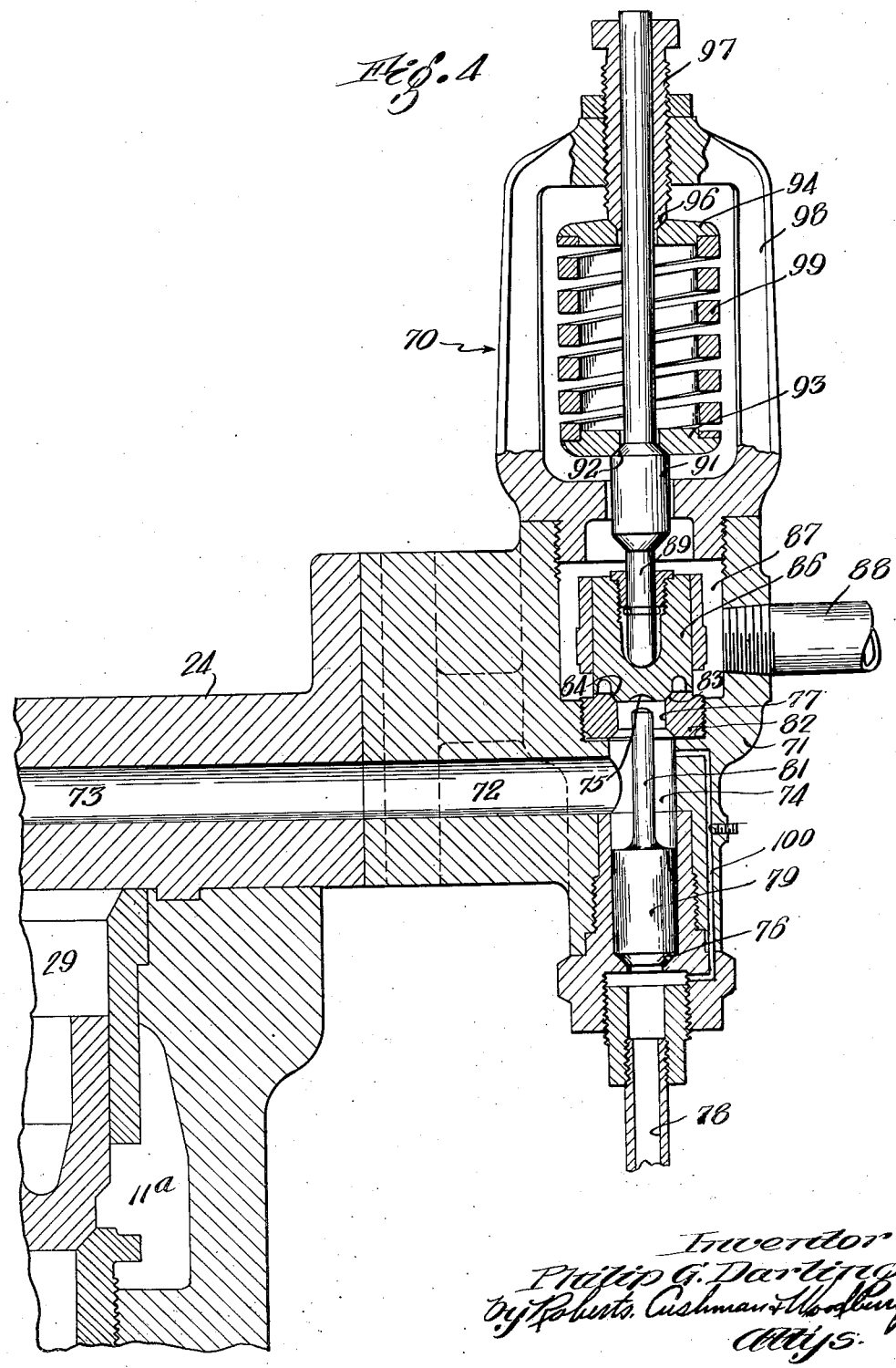

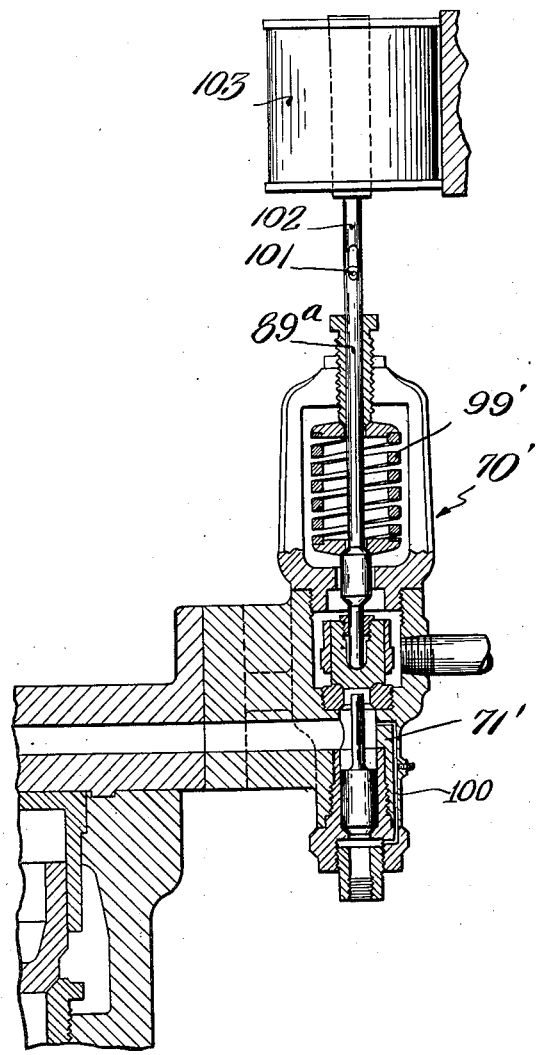

Patented July 3, 1934

1,965,307

UNITED STATES PATENT OFFICE 1,965,307

POWER CONTROL VALVE

Philip G. Darling, Bridgeport, Conn., assignor to Consolidated Ashcroft Hancock Company, New York, N. Y., a corporation of Delaware Application January 7, 1931, Serial No. 507,094

7 Claims. (Cl. 137—53)

This invention relates to power control valves, for example safety valves, of the pressure loaded type, and to a method as well as to mechanical means for controlling the action thereof.

Valves of this character are commonly controlled by pressure of the controlled fluid admitted through a relatively small port to a back-pressure chamber in which the pressure acts against the main valve member to hold the latter against its seat. On relieving the pressure in the back pressure chamber the main valve is opened by pressure of the controlled fluid acting over an area which is not large enough to cause the valve to open while full pressure is held in the back-pressure chamber. Opening of the main valve may therefore be effected by permitting pressure to escape from the back-pressure chamber at a greater rate than it can be admitted through the relatively small admission port. It is customary to provide a pilot valve for controlling the outlet from the back-pressure chamber. My Patent No. 1,500,674, dated July 8, 1924, discloses a valve of this type, but in the patented construction, the opening of the main valve and the blow-down is determined by a pilot valve always exposed to the full pressure of the main valve inlet and provided with a conventional overhanging lip, huddling chamber, and blow-down ring. The present invention provides a simplified construction and employs a new principle of blow-down control, namely that of opening the relief valve in direct response to pressure in the back-pressure chamber of the main valve, and holding the relief valve open by independent pressure actuated means subject to the pressure conditions which exist in the main inlet. In this system of control the opening of the main valve and the blow-down are determined in accordance with the predetermined relative size of suitable areas exposed to pressure, without recourse to the old and unsatisfactory expedient of employing a huddling chamber and blow-down ring.

In Patent No. 1,809,898, issued upon the co-pending application of Otto W. Heise, filed August 26, 1925, Serial No. 52,703, there is disclosed a power control valve of this general class which is equipped with electrical means for actuating the pilot valve and thereby controlling the action of the main valve. This electrical apparatus functions in response to pressure at any desired point in the system to open the pilot valve and to hold the latter open until the desired reduction in pressure has been effected, whereupon the pilot valve is closed positively and promptly. This apparatus provides a very good regulation and is satisfactory in all respects but as it depends in part on electrical energy for its operation, it will not function when the current is cut off.

Objects of the present invention are to provide mechanical control apparatus to supplement electrical control apparatus for power control valves; to provide mechanical control apparatus responsive to pressure at one point for opening the pilot valve and thereafter utilizing pressure from another desired point for holding the pilot valve open during a predetermined blow-down period; to improve the art of controlling valves of the class described by providing an improved method of control and mechanical control apparatus suitable for use in conjunction with electrical control apparatus or independently thereof; to provide improved mechanical control apparatus which is sensitive and yet positive in operation; to provide improved mechanical control apparatus of the class described of simple and efficient construction consisting of few parts which are relatively inexpensive to manufacture and maintain and yet cooperate to assure positive and dependable operation; and also to provide apparatus of the class described having an improved construction and arrangement of parts.

In the drawings:

Fig. 1 is a side elevation of a power control valve equipped with electrical and mechanical control apparatus in accordance with the present invention;

Fig. 2 is a top plan view of the power control valve and some of the associated control apparatus shown in Fig. 1;

Fig. 3 is a section along the line 3—3 of Fig. 2;

Fig. 4 is a section along the line 4—4 of Fig. 2; and

Fig. 5 is a view similar to Fig. 4 but showing a different embodiment of the invention.

In the apparatus selected for illustration as shown in Figs. 1 to 3 the main power control valve comprises a body 10 having an inlet passage 11 extending from the lower or attaching flange 12 up and around the exhaust passage 13 to the valve chamber 11ª in the upper part of the body from which communication is afforded through the port 14 to the exhaust passage 13. The port 14 is preferably formed by a bushing 16 which has threaded engagement with the body and is provided with a beveled seat 17 to receive the main valve disk or feather 18. This valve disk may be formed integral with or secured to a central spindle member 19 which depends below the disk and is mounted to slide at its lower end in a sleeve bearing 21 carried by the valve body. The spindle portion also extends upwardly above the disk to provide an abutment 22 which is of a length to engage an abutment 23 formed on the cover plate 24 which closes the upper end of the valve body. The abutments 22 and 23 are so positioned as to limit upward movement of the disk 18. The disk member 18 also carries an upwardly extending cylindrical skirt 25 which is provided with an outwardly tapering exterior shoulder 26. A bushing 27 is mounted in the body at the upper part of chamber 11$^a$ to provide a cylindrical bearing in which the skirt 25 may reciprocate as the valve opens and closes. At some suitable point in the skirt 25 a relatively small admission port 28 is provided for admitting pressure from the valve chamber 11$^a$ into the back pressure chamber 29 which is formed by the interior of the skirt 25, the bushing 27, and the cover member 24. The lower end of the exhaust passage 13 may, if desired, have an opening thereto closed by a threaded plug 31 while the upper end of this passage may be connected by means of a pipe 32 to any suitable chamber or point of discharge.

A pilot valve, indicated generally at 33, is mounted on the cover member 24 and comprises a body 34 having an inlet passage 36 which registers with a passage 37 leading up through the cover member 24 from the chamber 29. The passage 36 extends upwardly through the body of the pilot valve casing to a chamber 38 which is provided with an exhaust port 39. A valve disk 41 is disposed in this chamber and adapted to cooperate with a seat 42 to close the passage 36. A valve stem 43 has its lower end engaged with the valve disk and is slidably supported in a bushing 4 having threaded engagement with a yoke 46 carried by the valve body. The stem member 43 has an enlargement 47 which provides a tapering shoulder 48 against which a spring abutment 49 is disposed. A similar spring abutment 51 is seated in a like manner against a tapered shoulder 52 formed on the lower end of the bushing 44. A coiled spring 53 is mounted between these abutments so as to tend normally to urge the valve stem and the disk 41 engaged thereby downwardly to close the passage 36.

The upper end of the stem 43 is connected at 54 to a lever 56 which is mounted to pivot at 57 on a bracket 58 carried by the cover member 24 of the main valve. A solenoid 59 is mounted in a casing 61 secured to the bracket 58, preferably in a position below the outer end of the lever 56. The core of this solenoid is pivotally connected by a connecting link 62 to the adjacent end of the lever 56. An arm 63, extending from the bracket 58 or any other fixed support to a position above the lever 56, carries a depending abutment or stop member, for example a bolt 64 having threaded engagement with the arm 63 and which may be locked in the desired position of adjustment by a lock nut 66. The lower end of this bolt is disposed in the path of movement of the lever 56 for limiting movement thereof. On referring to Fig. 1 it will be seen that a connection 67 extends between the casing 61 and a control box 68 which may be mounted upon a control panel or at any other desired station and contains pressure controlled electrical apparatus, for example of the type disclosed in the aforementioned copending application of Otto W. Heise.

Associated with the main valve is a second pilot valve, indicated generally at 70 in Figs. 1 and 4, comprising a body 71 (Fig. 4) which is attached to the cover member 24 of the main valve body in any approved manner and has a horizontal passage 72 which registers with a similar passage 73 in the cover member 24, the latter passage communicating with the pressure chamber 29 of the main valve. The body 71 of this pilot valve has a cylindrical passage 74 and also has ports 76 and 77 at its lower and its upper ends, respectively, leading into the passage 74, the passage 72 merging with passage 74 at a point adjacent the upper end of the latter. The port 76 at the lower end of the passage 74 is connected by a tube 78 to the inlet passage 11 of the main control valve. A piston 79 is mounted to reciprocate in the cylindrical passage (or cylinder) 74 and carries a stem or abutment member 81 which extends from the head of the piston upwardly.

The port 77 at the upper end of the cylinder is formed in an annular seat ring 82 which has threaded engagement with a complementary recess in the valve body and has a beveled seat 83 with which a valve 86 is adapted to cooperate for closing the port. The valve 86 is disposed in a chamber 87 which is formed in the valve body, and which is provided with an exhaust connection 88. A valve stem 89 is connected to the valve 86 and has a cylindrical enlargement 91 which provides at its upper end a tapered shoulder 92. A lower spring abutment 93 rests on this shoulder and an upper spring abutment 94 engages a shoulder 96 formed on the lower end of a bushing 97. This bushing slidably receives the upper end of the valve stem and has threaded engagement with a yoke member 98 secured to the valve body. A spring 99 is interposed between the seat members 93 and 94 so as normally to urge the stem and the valve member 86 downwardly to close the port 77.

The apparatus shown in Fig. 5 is similar in all respects to that shown in Fig. 4 with the exception that the upper end of the valve stem 89$^a$ has pin and slot connection at 101 with the core piece 102 of a solenoid 103, this solenoid being controlled by electrical apparatus (not shown) in the same manner as described with reference to the solenoid 59 shown in Fig. 3.

In the operation of the main valve 10 and the electrical control apparatus, as shown more clearly in Figs. 1 to 3, pressure fluid to be controlled passes through the inlet passage 11 upwardly around the exhaust passage 13 to the chamber 11$^a$. Assuming that the pilot valve 33 is closed and the main valve disk 18 is on its seat, pressure from the upper end of the inlet passage will be admitted through the relatively small admission port 28 into the pressure chamber 29 where this pressure will be effective for holding the valve member 18 on its seat. When the pilot valve 33 is raised from its seat by the solenoid 59 in response to the action of the remote control apparatus disposed in the control box 68, it opens the passage 36 so that pressure fluid is permitted to escape from the pressure chamber 29 to the atmosphere. The passage 36 is of such a size as to permit pressure to escape from the pressure chamber 29 at a greater rate than it can be admitted to this chamber through the port 28.

The tapered exterior shoulder 26 provides an area against which the pressure of the controlled fluid may act to lift the main valve from its seat when the back pressure in chamber 11$^a$ is released, so that as soon as the pilot valve opens, the main valve disk is opened by the pressure acting against the tapered shoulder 26. The pilot valve 33 is lifted from its seat when the solenoid 59 is so energized as to move the lever 56 in a clockwise position about its pivot point 57 to raise the stem 43 of the pilot valve. The solenoid is effective through the pressure controlled electrical apparatus 68 to hold the pilot valve open until the desired pressure reduction has been effected, whereupon the solenoid is deenergized and the pilot valve is forced down on its seat by the spring 53. The action of this apparatus is positive and takes place smoothly without chattering. If, however, for any reason the electrical apparatus should fail to function, the mechanical control of Fig. 4 will act, the two devices mutually forming safeguards for one another. Thus, assuming that the main valve parts are in the position of Fig. 3, the disk 18 being on its seat, and the electrical control failing to operate at the desired pressure, it will be noted that pressure from the back-pressure chamber 29 is transmitted through the passages 73 and 72 to the cylinder 74 above the piston 79. At the same time pressure from the inlet passage 11 is transmitted through the tube 78 (Figs. 1 and 4) to the lower port 76 and acts against the lower side of the piston.

Under these conditions the pressures on the two sides of the piston 79 are equal and hence it is free to drop by gravity to the lower end of the cylinder. The pilot valve 70 is set to open at a predetermined popping pressure ordinarily somewhat higher than that which causes pilot valve 33 to open, and when this pressure is attained in the chamber 29 it is communicated through the passages 73 and 72 to the upper end of the cylinder 74 and causes the pilot or relief valve member 86 to be lifted off of its seat. When this occurs the pressure above the piston 79 and likewise the pressure in the chamber 29 of the main valve fall almost instantly to atmospheric pressure. Ordinarily the valve member 86 would return to its seat immediately, before an adequate reduction of pressure had been effected, which would tend to produce an intermittent or hunting movement of the main valve disk 18 as well as to cause chattering of the pilot disk 86. This condition is avoided with the present construction by the arrangement of the piston 79 and the tube 78 which conducts fluid from the inlet passage 11 to the under side of this piston. Thus as soon as the pressure is relieved from above the piston 79, the latter becomes unbalanced and is forced upwardly by pressure acting through the tube 78 from the inlet passage 11. The upward movement of the piston causes the abutment member 81 to engage the complementary recess 75 in the valve disk 86 and thus provides a support for holding the valve disk off its seat until the desired blow-down pressure has been attained.

The area of the piston 79 is such that with inlet pressure beneath and reduced pressure approximating atmospheric pressure above, it holds the valve 86 up while pressure fluid from the main valve exhausts through the exhaust passage 13 to the atmosphere. During the time the main valve is blowing the relief valve 86 remains fully open until the pressure beneath it has reduced sufficiently so that the total pressure under the piston 79 is overcome by the spring 99, whereupon the pilot valve closes quickly.

In the operation of a power control apparatus as shown in Figs. 1 to 4, the electrical apparatus is set normally to function to relieve the pressure from the chamber 29 at a somewhat lower pressure than that at which the mechanical control apparatus shown in Fig. 4 is set, and thus should the electrical apparatus fail to function for any reason it is assured that the main valve 18 will open before the pressure in inlet 11 has risen excessively.

It is worthy of observation that the mechanical control apparatus functions to permit pressure fluid to escape from the chamber 29 in response to pressure conditions in this chamber, but that once the valve member 86 is raised off its seat it is held in open position by pressure conditions at another point in the system, for example by pressure in the inlet passage 11.

While very good action of this mechanical control apparatus may be obtained by proportioning the areas of the piston 79 and the valve seat of the member 86 so as to enable the spring 99 to close the pilot valve without an excessive pressure reduction or blow-down through the main valve 10, it is also contemplated that these results may be obtained with great certainty by arranging a by-pass 100 around the piston 79. This by-pass, which may be of adjustable capacity, conducts some pressure fluid to a point above the piston while the latter is holding the pilot valve open and hence the spring 99, instead of acting against the full steam pressure in the inlet passage 11 pressing against the under side of the piston, acts only against the differential pressure. Approximately the same result may be obtained by providing a variable clearance for the piston 79.

In the embodiment illustrated in Fig. 5, a single pilot valve 70′ is arranged to be actuated both by the electrical and by the mechanical control apparatus. Thus the solenoid 103 is intended to be controlled by electrical control apparatus such as that provided for actuating pilot valve 33 in Fig. 3. The pilot valve is ordinarily opened by energizing the solenoid, and the spring 99′ is so selected as to permit this valve to open by fluid pressure only after the pressure in the inlet exceeds that at which the solenoid is designed to act. As soon as the pilot valve is raised off of its seat, the mechanical control apparatus 71′ functions in the same manner as described with reference to Fig. 4. Also on failure of this solenoid 103 to act, the mechanical control apparatus functions to relieve the pressure from the back pressure chamber in the same manner as described with reference to Figs. 1 and 4, the pin and slot connection 101 permitting the mechanical control apparatus to operate independently of the electrical pressure control.

It should be understood that the present disclosure is for the purpose of illustration only and that this invention includes all modifications and equivalents which fall within the scope of the appended claims.

I claim:

1. A valve device comprising a casing having a chamber therein provided with a lateral port and with end ports, a piston reciprocable in the chamber between the lateral port and one of the end ports, a pilot valve for controlling the second end port, the piston having a stem which extends toward the pilot valve and which engages the latter upon movement of the piston, the diameter of the piston being greater than the normally exposed area of the valve, means for delivering pressure fluid from one source to the lateral port, means for delivering pressure fluid from another source to the first end port, and means permitting limited passage of pressure fluid from said latter port around the piston to the other end of the latter.

2. A valve device comprising a casing having therein a seat, a movable valve member engageable with the seat, a back pressure chamber for holding the valve member on its seat, a pilot valve for controlling the flow from the pressure chamber, the pilot valve being adapted to open at a predetermined pressure in the pressure chamber for relieving the pressure therein, a movable member normally exposed on one side to the pressure in said chamber and at its other side to a balancing pressure, and an adjustable bypass from one side of said movable member to the other, said member moving in response to unbalanced pressure when the pilot valve opens and thereby positioning a part thereof to hold the pilot valve open.

3. In a system comprising means providing a passage for pressure fluid, a safety valve for relieving pressure from the system, a back pressure chamber for holding pressure against the safety valve to maintain the latter closed, and means for delivering pressure fluid from the system to the pressure chamber, the combination of a pilot valve for relieving pressure from the pressure chamber, remote control means comprising a solenoid for actuating the pilot valve and means responsive to pressure in the system at a point remote from the safety valve for actuating the solenoid, the pilot valve being directly responsive to pressure in the pressure chamber and opening in response to predetermined pressure therein and means for holding the pilot valve open until the pressure in the system has been reduced to a predetermined value.

4. In a system comprising means providing a passage for pressure fluid, a safety valve for relieving pressure from the system, a back pressure chamber for holding the safety valve closed, and means for delivering pressure fluid from the system to the pressure chamber, the combination of a pilot valve for relieving pressure from the pressure chamber, remote control means comprising a solenoid for actuating the pilot valve and means responsive to pressure in the system for actuating the solenoid, the pilot valve being operative to open directly in response to a predetermined pressure in the pressure chamber, and means effective on a reduction of pressure in the pressure chamber for holding the pilot valve open until the pressure in the system has been reduced to a predetermined value.

5. In a system of the character described having a conduit for pressure fluid and a main valve for controlling the flow of fluid through said conduit, said main valve comprising a seat and a feather, and a back pressure chamber communicating with the inlet end of the conduit and in which sufficient pressure is normally maintained to hold the valve feather on its seat, means providing an exhaust passage leading from said back pressure chamber, a pilot valve normally closing said passage, means responsive to a predetermined pressure in the inlet end of the conduit and thereby operating to open the pilot valve and relieve the pressure in the back pressure chamber of the main valve, means providing an emergency relief passage leading from a point in said exhaust passage adjacent to the back pressure chamber, an emergency relief valve normally closing said relief passage, said emergency valve normally responding directly to a predetermined pressure in the back pressure chamber of the main valve, thereby to open the emergency relief passage, and means responsive to pressure in the inlet end of the conduit to hold said relief valve open after it has been opened until said inlet pressure has dropped to a predetermined value.

6. In a system of the character described having a conduit for pressure fluid and a main valve for controlling the flow of fluid through said conduit, said main valve comprising a seat and a feather, and a back pressure chamber communicating with the inlet end of the conduit and in which sufficient pressure is normally maintained to hold the valve feather on its seat, means providing an exhaust passage leading from said back pressure chamber, a pilot valve normally closing said passage, pressure sensitive means remote from the main valve and arranged to respond to a predetermined pressure in the inlet end of the conduit, electromagnetic means normally responsive to said pressure sensitive means, thereby to open said pilot valve when the inlet pressure reaches said predetermined value, means providing an emergency relief passage communicating with the back pressure chamber of the main valve, a relief valve normally closing said relief passage, said relief valve directly responding to a predetermined pressure in the back pressure chamber of the main valve and thereby opening the relief passage and a part responsive to differential pressures in the back pressure chamber and in the inlet end of the conduit to hold the relief valve open after it has been opened until the inlet pressure has dropped to a predetermined value.

7. In a system of the character described having a conduit for pressure fluid and a main valve for controlling the flow of fluid through said conduit, said main valve comprising a seat and a feather, and a back pressure chamber communicating with the inlet end of the conduit and in which sufficient pressure is normally maintained to hold the valve feather on its seat, means providing an exhaust passage leading from said back pressure chamber, a pilot valve normally closing said passage, means responsive to a predetermined inlet pressure for raising the pilot valve, thereby to exhaust pressure fluid from the back pressure chamber of the main valve, means providing an emergency relief passage leading from said back pressure chamber, a spring-pressed relief valve normally closing said emergency relief passage, said relief valve normally opening in response to pressure in the back pressure chamber in excess of the pressure which normally causes the pilot valve to open, and a fluid actuated piston having one face exposed to the pressure in the back pressure chamber, and another face exposed to the inlet pressure, said piston moving in response to unbalanced pressures upon its respective faces and thereby being so positioned as to prevent return of said relief valve to its closed position until the pressure in the inlet chamber has dropped to a predetermined value.

PHILIP G. DARLING.